(12) United States Patent
Jabaud et al.

(10) Patent No.: US 8,521,702 B2
(45) Date of Patent: Aug. 27, 2013

(54) METHOD FOR AGGREGATING WEB FEED MINIMIZING REDUNDANCIES

(75) Inventors: Philippe Jabaud, Nozay (FR); Gérard Burnside, Nozay (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/937,795

(22) PCT Filed: Apr. 9, 2009

(86) PCT No.: PCT/EP2009/054324
§ 371 (c)(1),
(2), (4) Date: Feb. 4, 2011

(87) PCT Pub. No.: WO2009/144078
PCT Pub. Date: Dec. 3, 2009

(65) Prior Publication Data

US 2011/0119239 A1    May 19, 2011

(30) Foreign Application Priority Data

Apr. 14, 2008 (EP) .................................. 08290366

(51) Int. Cl.
*G06F 17/30* (2006.01)
(52) U.S. Cl.
USPC ........................................................ 707/692
(58) Field of Classification Search
USPC ........................................................ 707/692
See application file for complete search history.

(56) References Cited

U.S. PATENT DOCUMENTS

| 2008/0046543 | A1 | 2/2008 | Chasen et al. | |
|---|---|---|---|---|
| 2009/0089380 | A1* | 4/2009 | Wang et al. | 709/206 |
| 2010/0063962 | A1* | 3/2010 | Goradia | 707/640 |

FOREIGN PATENT DOCUMENTS

WO  WO 2008/016997    2/2008

OTHER PUBLICATIONS

Reichert, Sandro, et al., Feeding the World: A Comprehensive Dataset and Analystis of a Real World Snapshot of Web Feeds, Dec. 2011, pp. 1-8.*
IBM, "ip.com: Enabling end users in configuring and filtering web feeds" An IP.com Prior Art Database Technical Disclosure, Sep. 9, 2008, pp. 1-5.*
Ian Garcia et al., "Eliminating Redundant and Less-Informative RSS News Articles Based on Word Similarity and a Fuzzy Equivalence Relation," Proceedings of the 18th IEEE International Conference on Tools with Artificial Intelligence (ICTAI'06), XP031031473, pp. 465-473, Nov. 1, 2006.
Iuliana Dogaru et al., "Conceptual Architecture of a Multi-Agent System for News Syndication," Proceedings of the Eighth International Symposium on Symbolic and Numeric Algorithms for Scientific Computing (SYNASC'06), XP031044316, pp. 201-204, Sep. 1, 2006.
Scott Graham, "IRA: Intelligent RSS Aggregation," Online http://www.pubsub.com/trackinq.php, Blog/RSS Activity from Apr. 2004 to Jan. 2005, XP002494931, 14 pages, retrieved on Sep. 8, 2008.
International Search Report for PCT/EP2009/054324.

* cited by examiner

*Primary Examiner* — Sheree Brown
(74) *Attorney, Agent, or Firm* — Fay Sharpe LLP

(57) ABSTRACT

When aggregating syndicated Web content, updated content is retrieved from predetermined Web feeds. The updated content is compared with stored content previously retrieved. If the updated content is determined to be different from the stored content, the updated content is stored. If the updated content is determined to be identical to the stored content, the updated content is delete.

10 Claims, 2 Drawing Sheets

METHOD FOR AGGREGATING WEB FEED MINIMIZING REDUNDANCIES

FIELD OF THE INVENTION

The invention relates to the aggregation of Web feed.

BACKGROUND OF THE INVENTION

Since its beginnings in the early 1990s, the World Wide Web has become very popular and it now comprises several billions of Web pages including various contents such as texts, images, videos, and links (also referred to as hyperlinks) to other Web pages. The World Wide Web is used daily by billions of Web surfers.

Getting online nowadays is quite simple and requires neither particular skills nor particular proceedings before a national or international office, which in fact does not exist. Surprisingly, no attempt was made to classify the Web in order to group Web sites within families (based upon predetermined criteria), although anyone would benefit from such a classification. Therefore, it is becoming more and more difficult for the Web surfers to retrieve substantive and reliable updated information. Web browsers are of help, of course, but with the increasing number of Web pages, numerous semantic search requests result in raw content which is mostly unclassified, often redundant, inexplicit, and, in the end, simply unworkable.

In the early 2000s, a solution was provided though, called syndication, to help surfers get the right information at the proper moment. In syndication, a section of a Web site is made available for other Web sites to use. More specifically, in Web syndication, content (commonly referred to as Web feed) is put on a Web site in a particular format—often XML-based (XML stands for eXtensible Markp Language), such as RSS (Real Simple Syndication) or Atom—and associated with a feed link which another user (client) can subscribe to in order to retrieve the corresponding content by means of a particular application called a feed aggregator, also referred to as a feed reader or a news reader, running locally on the client's terminal or server.

Having subscribed to a feed, a feed aggregator may be configured to check for and retrieve updated content at predetermined intervals (which may be user-defined). Modern Web browsers often include built-in aggregators, such as iGoogle™ and My Yahoo™. U.S. patent applications No. US 2008/0034058 (Assigned to Marchex, Inc.) and US 2008/0046543 (Assigned to RealNetworks) both illustrate methods for obtaining Web feeds.

Although feed aggregators are a powerful resource for retrieving updated information from the World Wide Web and making it available to an end user via a user-friendly graphical interface (GUI), the volume of articles can sometimes be overwhelming, especially when the user has subscribed to many Web feeds. To address this problem, some feed aggregators include functionalities to allow users to tag the feeds with keywords in order to sort and filter the available articles into easily navigable categories. However this solution is time-consuming, since the user has to do a pre-classification of the feeds from which he wishes to obtain updated content. In addition, tagging Web feeds is simply useless when the content to be retrieved changes subject with each update (such as in newspapers Websites).

SUMMARY OF THE INVENTION

Clearly there is a need for a solution allowing Web surfers to get, in an automated way, information retrieved from Web feeds in a fully workable manner.

It is an object of the invention to provide such a solution.

Accordingly, according to one aspect, the invention provides a method for aggregating syndicated Web content, comprising the steps of:

Retrieving updated content from predetermined Web feeds;

Comparing said updated content with stored content previously retrieved (and stored e.g. as an entry within a feeds historic database);

Storing the updated content if it is considered different from the stored content;

Deleting the updated content if it is considered identical to the stored content.

Further steps may be provided, i.e.:

a step of adding the updated content to a stored content if it is considered complementary thereto;

a step of computing a similarity index $S_k^j$ to denote a degree of similarity between the updated content and the stored content;

a step of comparing said similarity index $S_k^j$ to one or more thresholds. More specifically, the similarity index $S_k^j$ is compared to two thresholds $S_{min}$ and $S_{max}$, whereby If the similarity index $S_k^j$ is lower than $S_{min}$, the updated content is considered different from the stored content;

If the similarity index $S_k^j$ is greater than $S_{max}$, the updated content is considered identical to the stored content and may therefore be added thereto;

If the similarity index $S_k^j$ is comprised between $S_{min}$ and $S_{max}$, the updated content is considered complementary to the stored content.

According to another aspect, the invention provides a feed aggregator comprising:

A feed reader configured for checking for and retrieving updated content from predetermined Web feeds;

A filtering module configured for managing comparison of said updated content to stored content previously retrieved;

A feeds historic database for storing content.

The feed aggregator may also comprise one or more entry analyzers linked to the filtering module, configured for comparing said updated content to stored content. More specifically, the one or more entry analyzer may be configured for:

computing a similarity index $S_k^j$ denoting a degree of similarity between the updated content and the stored content, and comparing said similarity index to one or more thresholds to determine whether the updated content is to be removed or added to the feeds historic database.

The above and other objects and advantages of the invention will become apparent from the detailed description of preferred embodiments, considered in conjunction with the accompanying drawings.

DESCRIPTION OF PREFERRED EMBODIMENTS

Figure 1:
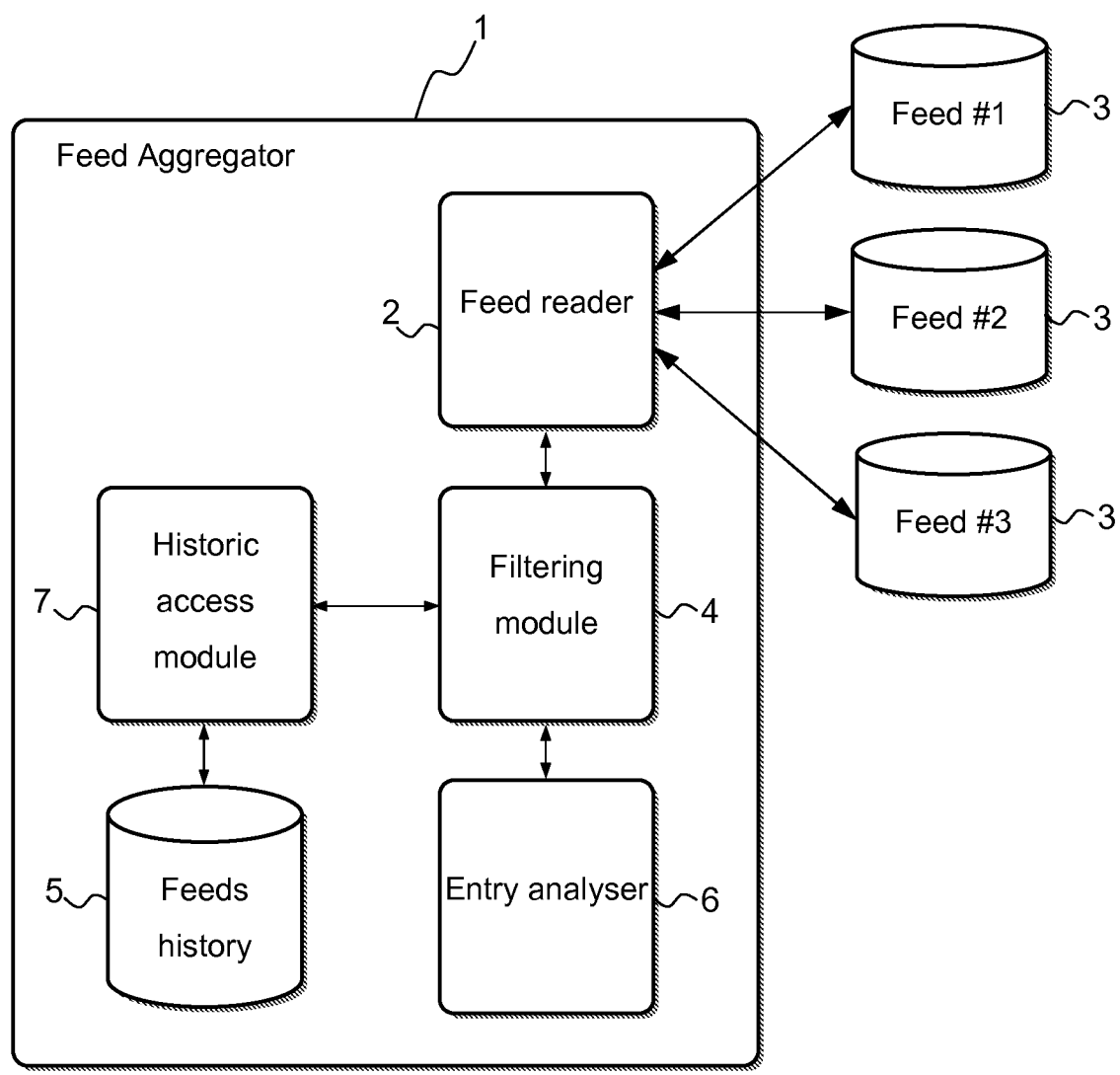
FIG. 1 is a diagrammatic view showing the structure of a feed aggregator according to the invention.
Figure 2:
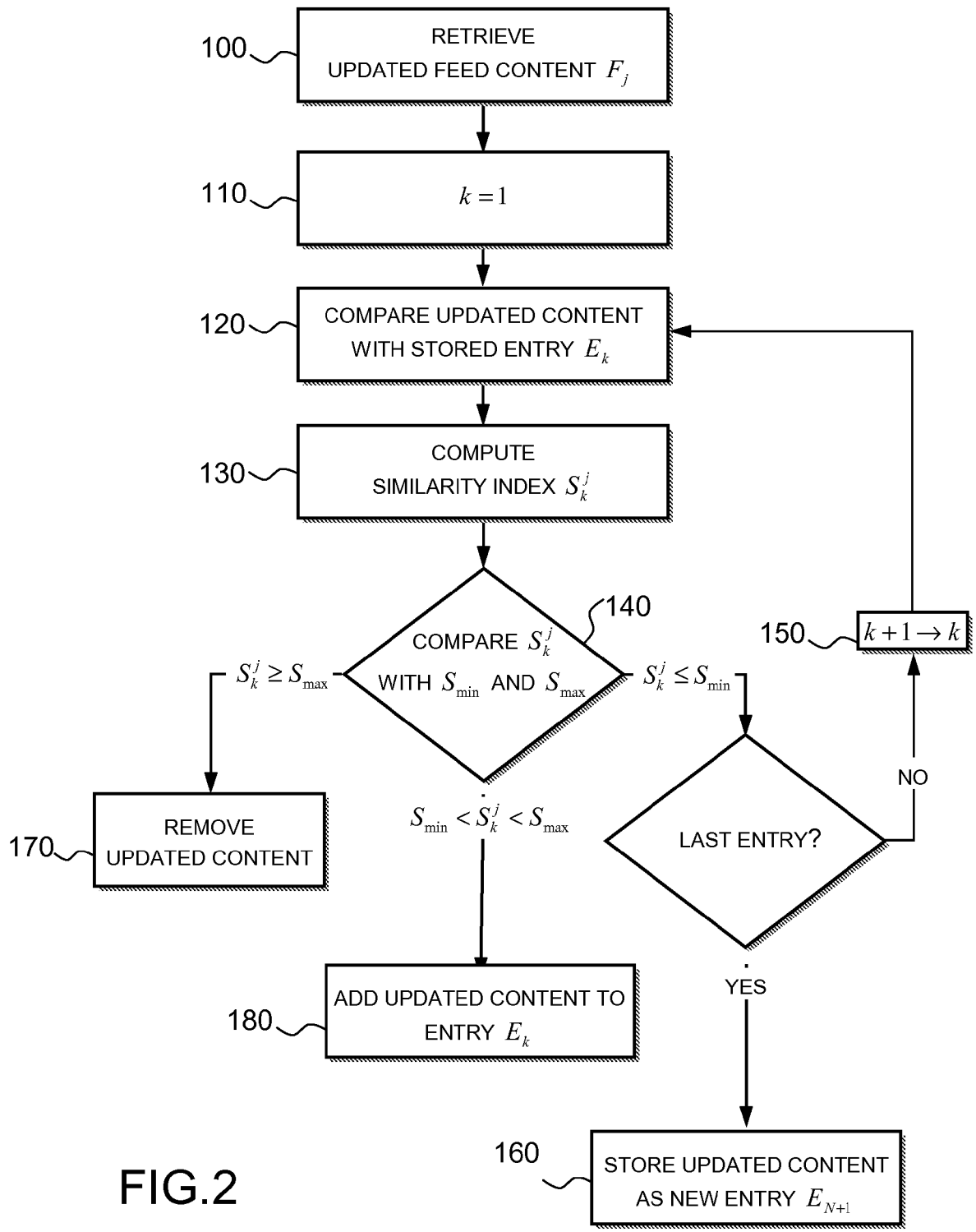
FIG. 2 is flow chart of a method for aggregating syndicated Web content according to the invention.

Turning now to the drawings, there is shown on FIG. 1 a feed aggregator 1, implemented as a computer program on a processing unit of a computer device such as a personal computer (PC), a server, a communicating personal digital assistant (PDA), a Smartphone, etc.

The feed aggregator 1 comprises a feed reader module 2, configured to check and retrieve updated syndicated Web content from Web feeds 3 provided on distant Web sites. Although the feed aggregator 1 is preferably configured to deal with RSS feeds, any other format may be used (such as Atom). Three Web feeds 3 are drawn on FIG. 1, for illustrative purposes only, for the feed aggregator 1 may be linked to Web feeds as numerous as might be configured by the user.

The feed aggregator 1 also comprises a filtering module 4, linked to the feed reader 2 and to which the feed reader 2 transfers the retrieved updated content to be further processed so as to eliminate redundancies, as will be disclosed hereinafter.

The feed aggregator 1 further comprises a feeds historic database 5, wherein feed content previously retrieved is stored as entries.

The feed aggregator 1 further comprises at least one entry analyzer 6, linked to the filtering module 4, configured to compare updated content with content previously retrieved and stored as entries within the feeds historic database 5, in order to determine whether the updated content should be:
  removed from the feed aggregator 1,
  stored within the database 5 as a new entry,
  or added to an existing entry within the database 5.

The feed aggregator 1 also comprises a historic access module 7, interposed between the filtering module 4 and the feeds historic database 5, and configured to access and manage the feeds historic database 5 in order to store the updated content which has been determined by the filtering module 4 as suitable for being stored as a new entry or added to an existing entry.

Precise operation of the feed aggregator 1 will now be described.

As often as user-configured, the feed reader 2 checks for and retrieves updated content from predetermined Web feeds 3 subscribed to by the user (100). In the following description, it is assumed that the feed reader 2 is configured with P subscriptions, P being an integer number greater than or equal to 1 ($P \geq 1$). $F_j$, where j is an integer number smaller than or equal to P ($1 \leq j \leq P$), denotes the updated content retrieved from the jth Web feed 3. $F_j$ may comprise complete Web pages or part therefrom: text, images, videos, hyperlinks, etc. It is further assumed that the feeds historic database 5 comprises a number N of entries, N being an integer number greater than or equal to 1 ($N \geq 1$). $E_k$, where k is an integer number smaller than or equal to N ($1 \leq k \leq N$), denotes the kth entry stored in the feeds historic database 5.

Updated content $F_j$ is transferred by the feed reader 2 to the filtering module 4 where it is temporarily stored. The filtering module 4 retrieves, through the historic access module 7, the list of stored entries $E_k$ to which the updated content $F_j$ shall be compared. More precisely, the filtering module 4 iterates over the list of stored entries $E_k$, to which the updated content $F_j$ is to be compared in order to be classified among the following categories: to be removed (deleted); to be added to a stored entry $E_k$; to be stored as a new entry $E_{N+1}$.

More precisely, with k initially set equal to 1 (110), the updated content $F_j$ is compared (120) with the stored entry $E_k$ by at least one entry analyzer 6. Comparison may be achieved through various methods:
  Basic string comparison of titles;
  Syntax analysis, to determine common keywords between the compared contents;
  Semantic-based analysis, to determine common ontological concepts used in the compared contents. In order to limit the field of comparison, the ontology domains may be restricted by predetermined tags associated with the entries $E_k$.

These comparison methods may be used alone, or combined as different steps of a whole comparison process. A combined use of the comparison methods may be hierarchic. In other words, the syntax analysis step may be launched only if the basic string comparison step of the titles has lead to an assertion that the titles are identical, in order to determine whether contents having same titles may although be different. In turn, the semantic-based analysis step may be launched only if the syntax analysis step has determined that the syntax is similar, in order to further increase the degree of precision of the comparison. Each step of the comparison may be run on a different entry analyzer 6.

Having achieved comparison between updated content $F_j$ and stored entry $E_k$, the entry analyzer 6 computes (130) a similarity index $S_k^j$, which denotes a degree of similarity between $F_j$ and $E_k$. The similarity index $S_k^j$ is provided to the filtering module 4, which, firstly, determines, based upon the value of $S_k^j$, whether $F_j$ and $E_k$ are to be considered identical or different, and, secondly, consequently takes the corresponding decision regarding $F_j$. Basically, $S_k^j=0\%$ means that $F_j$ and $E_k$ are to be considered different, whereas $S_k^j=100\%$ means they are to be considered identical. As $S_k^j$ may be different both from 0 and 100, meaning that, although $F_j$ and $E_k$ may not be considered identical, they may not be considered different either. In order to make an appropriate decision regarding the updated content $F_j$, the filtering module 4 may be implemented with at least one threshold S, such that:
  If $S_k^j < S$, $F_j$ is to be considered different from $E_k$;
  If $S_k^j \geq S$, $F_j$ is to be considered identical to $E_k$.

In a preferred embodiment, the filtering module 4 is implemented with two thresholds, $S_{min}$ and $S_{max}$, with $S_{min} < S_{max}$, whereby:
  If $S_k^j \leq S_{min}$, $F_j$ is to be considered different from $E_k$;
  If $S_k^j \geq S_{max}$, $F_j$ is to be considered identical to $E_k$;
  If $S_{min} < S_{kj} < S_k^j <$, $F_j$ is to be considered complementary to $E_k$.

Thresholds $S_{min}$ and $S_{max}$ may be set according to a required degree of precision that may vary from one user to the other. Default values may be set to $S_{min}=20\%$ and $S_{max}=80\%$.

The filtering module compares (140) the similarity index $S_k^j$ to the thresholds $S_{min}$ and $S_{max}$ and computes a decision regarding $F_j$ among the following options:
  If $F_j$ is considered different from $E_k$ ($S_k^j \leq S_{min}$), then $F_j$ shall be compared with the next entry. More specifically, k is incremented by 1 (150) and the comparison process is reiterated with $F_j$ and $E_{k+1}$. If entry $E_k$ is the last one (k=N), then $F_j$, as it is considered different from all entries $E_k$ ($1 \leq k \leq N$), is provided by the filtering module 4 to the historic access module 7 to be stored within the feeds historic database 5 as a new entry $E_{N+1}$ (160).
  If $F_1$ is considered identical to $E_k$ ($S_k^j \geq S_{max}$), meaning that $F_j$ is redundant with $E_k$ (and therefore useless), then $F_j$ is removed (i.e. deleted from the feed aggregator 1) by the filtering module 4 (170);
  If $F_j$ is considered complementary to $E_k$ ($S_{min} < S_k^j < S_{max}$), then it is added to $E_k$ or combined therewith by the filtering module 4, which amends the existing entry $E_k$, and provides the historic access module 7 with the amended entry $E_k$ to replace within the feeds historic database 5 the entry $E_k$ previously stored.

This comparison process is repeated with all updated contents $F_j$, $1 \leq j \leq P$.

The method disclosed hereinbefore avoids redundancies, since only content which considered different from stored content is stored as a new entry. The disclosed aggregator 1 achieves true feed aggregation, whereby similar contents are merged instead of being simply juxtaposed.

The invention claimed is:

1. A method for aggregating syndicated Web content, comprising:
    retrieving updated content from predetermined Web feeds;
    comparing said updated content with stored content previously retrieved;
    storing the updated content if it is considered different from the stored content;
    deleting the updated content if it is considered identical to the stored content;
    wherein a similarity index $S_k^j$ that denotes a degree of similarity between the updated content and the stored content is compared to two thresholds $S_{min}$ and $S_{max}$ wherein:
    if the similarity index $S_k^j$ is lower than $S_{min}$, the updated content is considered different from the stored content; and
    if the similarity index $S_k^j$ is greater than $S_{max}$, the updated content is considered identical to the stored content.

2. The method according to claim 1, further including adding the updated content to a stored content if it is considered complementary thereto.

3. The method according to claim 1, including computing the similarity index $S_k^j$ to denote a degree of similarity between the updated content and the stored content.

4. The method according to claim 3, including comparing said similarity index $S_k^j$ to one or more thresholds.

5. The method according to claim 4, wherein:
    if the similarity index $S_k^j$ is between $S_{min}$ and $S_{max}$, the updated content is considered complementary to the stored content.

6. The method according to claim 1, wherein updated content considered identical to a stored content is added to said stored content.

7. The method according to claim 1, wherein previously retrieved content is stored as an entry within a feeds historic database.

8. A feed aggregator comprising:
    a feed reader configured for checking for and retrieving updated content from predetermined Web feeds;
    a filtering module configured for managing comparison of said updated content to stored content previously retrieved; and
    a feeds historic database for storing content;
    wherein the filtering module compares a similarity index $S_k^j$ that denotes a degree of similarity between the updated content and the stored content to two thresholds $S_{min}$ and $S_{max}$ wherein:
    if the similarity index $S_k^j$ is lower than $S_{min}$, the updated content is considered different from the stored content; and
    if the similarity index $S_k^j$ is greater than $S_{max}$, the updated content is considered identical to the stored content.

9. The feed aggregator according to claim 8, further comprising one or more entry analyzers linked to the filtering module, configured for comparing said updated content to stored content.

10. The feed aggregator according to claim 8, wherein one or more entry analyzer is configured for computing the similarity index $S_k^j$ denoting a degree of similarity between the updated content and the stored content, and wherein said filtering module is configured for comparing said similarity index to one or more thresholds to determine whether the updated content is to be removed or added to the feeds historic database.

* * * * *